United States Patent [19]

VanHooser et al.

[11] Patent Number: 4,597,782

[45] Date of Patent: Jul. 1, 1986

[54] FILTER BAG TENSIONING SYSTEM AND METHOD

[75] Inventors: William B. VanHooser, Baltimore; Robert J. W. Williams, Lutherville, both of Md.

[73] Assignee: Environmental Elements Corp., Baltimore, Md.

[21] Appl. No.: 694,966

[22] Filed: Jan. 25, 1985

[51] Int. Cl.[4] ............................................. B01D 46/00
[52] U.S. Cl. ........................................ 55/378; 55/97
[58] Field of Search ...................... 55/96, 97, 378, 379; 177/160, 172, 251, 261, 264

[56] References Cited

U.S. PATENT DOCUMENTS

| | | | |
|---|---|---|---|
| 1,941,849 | 1/1934 | Myers et al. | 177/264 X |
| 2,211,193 | 8/1940 | Zinke | 177/261 X |
| 2,381,086 | 8/1945 | Steele | 177/264 X |
| 3,021,911 | 2/1962 | Pecker | 177/251 |
| 3,097,715 | 7/1963 | Litchard | 177/261 X |
| 3,334,698 | 8/1967 | Von Ronn | 177/251 X |
| 4,339,251 | 7/1982 | Shumate | 55/378 |
| 4,373,936 | 2/1983 | Becker | 55/97 |

*Primary Examiner*—Charles Hart
*Attorney, Agent, or Firm*—Morton J. Rosenberg

[57] ABSTRACT

A filter bag tensioning system (10) for use in a bag house is provided. An adjustable tensioning mechanism (16) is pivotally coupled to a frame member (20) within the bag house for providing a predetermined tension on a filter bag (12). The adjustable tensioning mechanism (16) is releasably coupled on a second end (22) thereof to the bag (12) through an S-hook (26) and chain link (30) coupling. A weight member (38) is coupled to a first end (40) of the adjustable tensioning mechanism (16) for counterbalancing the weight of the bag (12). The adjustable tensioning mechanism (16) includes a mechanism for linearly displacing the weight (38) with respect to a pivot point (64) of the adjustable tensioning mechanism (16). The linear displacement of the weight (38) is accomplished by a linear displacement of a first tension adjustment member (56) with respect to a second tension adjustment member (58) in the longitudinal direction (18) and a securement of the first tension adjustment member (56) to the second tension adjustment member (58) when a predetermined tension is provided for the filter bag (12). In this manner, there is disclosed a filter bag tensioning system (10) which allows for the user to adjust the tension on the filter bags (12) as a function of the characteristics of the bag cleaning processes, as well as the bags (12).

27 Claims, 5 Drawing Figures

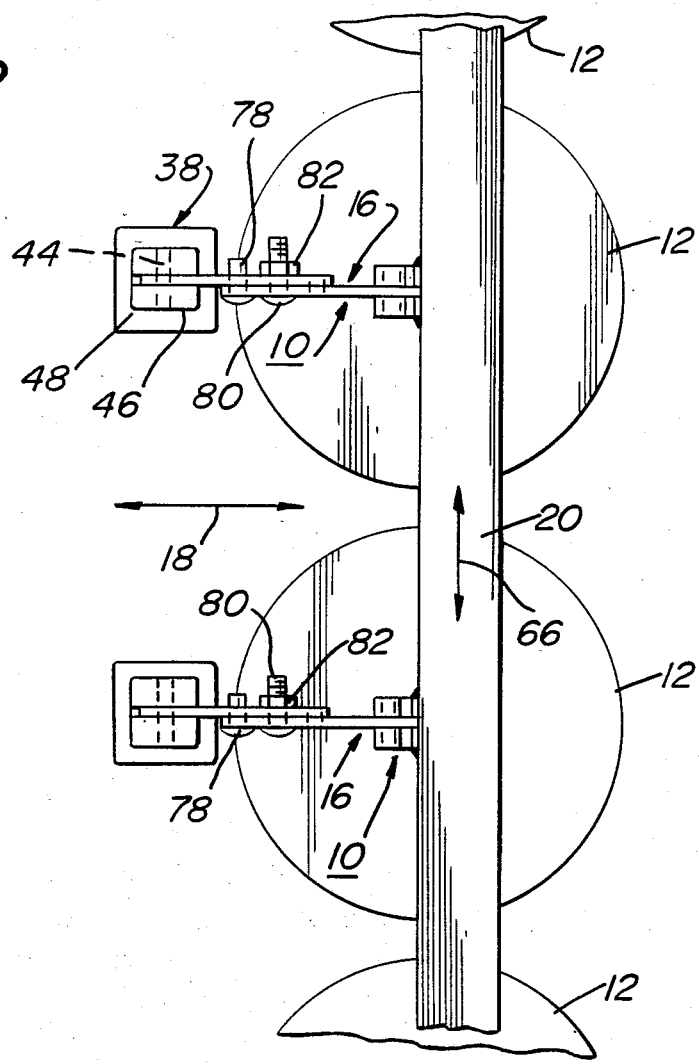
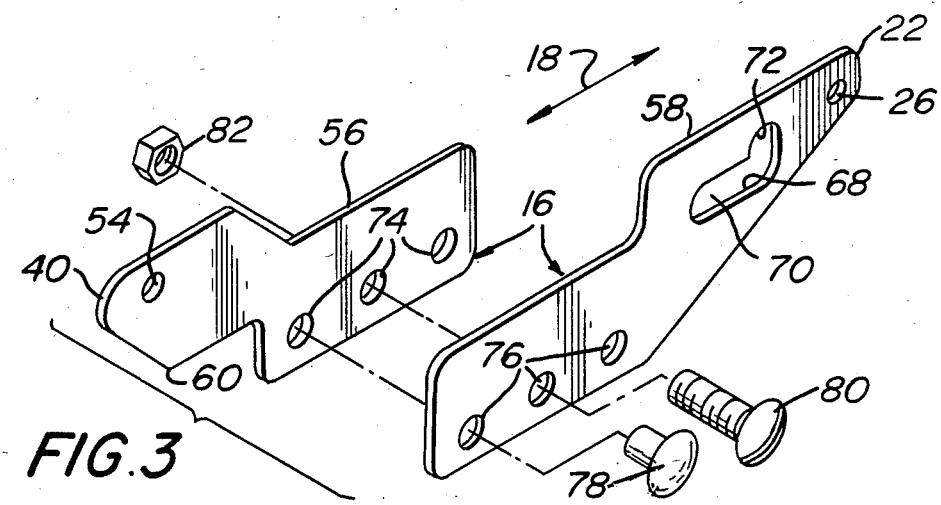

FILTER BAG TENSIONING SYSTEM AND METHOD

BACKGROUND OF THE INVENTION

1. Field of the Invention

This invention relates to the separation of particulates from a gaseous stream. In particular, this invention directs itself to an improved filter bag tensioning system and method of operation for a filter bag tensioning system of the counterweighted lever type for use in a bag house. More in particular, this invention pertains to a filter bag tension system which allows for an adjustable tensioning mechanism in order to provide a predetermined bag tension. Still further, this invention directs itself to a filter bag tensioning system which allows for the adjustment of a weight distance from a pivot point of the adjustable tensioning mechanism to the weight in order to allow for an adjustment of tension on the bags being held.

2. Prior Art

Filter bag tensioning systems and methods of operation are known in the prior art. In particular, the closest prior art known includes U.S. Pat. Nos. 4,373,936 and 4,381,039, which are generally directed to filter bag weighted holding systems and are owned by the Assignee of the subject invention concept. Additional prior art known to Applicant include U.S. Pat. Nos. 3,683,595; 2,642,276; 1,072,897; 4,217,117; 3,683,595; 3,504,729; 3,106,977; and, 497,670, which were referenced during the prosecution at the U.S. Patent and Trademark Office in the aforementioned U.S. Pat. Nos. 4,381,039 and 4,373,936.

None of the prior art counter-weight tensioning systems provide for adjustability of the adjustable tensioning mechanism to provide a predetermined bag tension in the manner or mode of the subject concept. In the prior art systems shown in U.S. Pat. Nos. 4,381,039 and 4,373,936, such provided tension on the bags which was a function of the counterweight and the distance of the weight from a fulcrum point. However, such prior art systems did not allow for the tension to be made adjustable by changing the distance of the weight to the fulcrum or pivot point. Additionally, in such prior art systems, any adjustment to be made had to be made in the changing of the weight. Thus, in order to readjust any type of tensioning in such prior art systems, the user had to be provided with various incremental weights which would be added to the original weight initially purchased, and such would entail additional handling of hardware and parts thereof wherein the subject concept system alleviates the need for additional hardware requirements.

CROSS-REFERENCE TO RELATED PATENTS

U.S. Pat. No. 4,373,936 issued on Feb. 15, 1983 having a title "FILTER BAG TENSIONING DEVICE AND METHOD" and assigned to the same Assignee as the subject patent application is hereby incorporated by reference. U.S. Pat. No. 4,381,039 issued on April 26, 1983 having a title "FILTER BAG WEIGHTED HOLDER", assigned to the same Assignee as the subject patent application is hereby incorporated by reference.

SUMMARY OF THE INVENTION

A filter bag tensioning system is provided for use in a bag house. The filter bag tensioning system includes an adjustable tensioning mechanism which is pivotally coupled to a frame member of the bag house for providing a predetermined bag tension. The adjustable tensioning mechanism is releasably coupled on a second end thereof to a bag being held. A weight is coupled to a first end of the adjustable tensioning mechanism for counterbalancing the weight of the bag. The adjustable tensioning mechanism includes a mechanism for linearly displacing the weight with respect to a pivot point of the adjustable tensioning mechanism.

BRIEF DESCRIPTION OF THE DRAWINGS

FIG. 2 is a planar view, partially in cut-away of the filter bag tensioning system mounted to a frame member of a bag house;

FIG. 3 is a perspective exploded view of the preferred embodiment of the adjustable tensioning mechanism;

DESCRIPTION OF THE PREFERRED EMBODIMENTS

Figure 1:
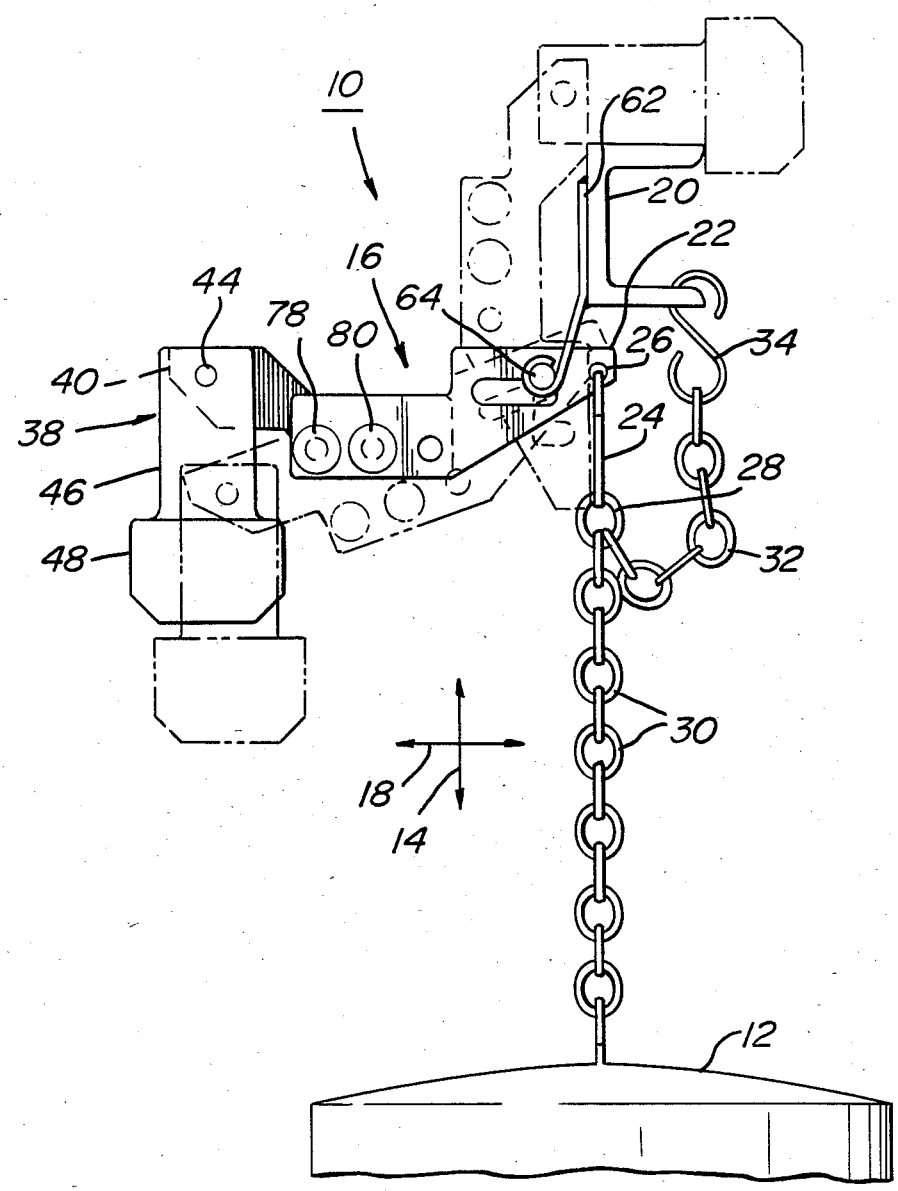
FIG. 1 is a frontal view of the filter bag tensioning system partially in cut-away, showing the filter bag tensioning system in varying positional deployments.

Referring now to FIGS. 1-3, there is shown filter bag tensioning system 10 for use in a bag house. The specific function and operation of a bag house is wellknown to those skilled in the art of gas filtration. In general, particulate laden gas is passed into an enclosure, i.e., bag house, within which is supported a plurality of fabric filter bags 12. Filter bags 12 commonly used in bag houses may have an approximate 8.0 inch diameter and include an elongated length in the order of 22.0 feet. Depending upon the particular mode of operation, not important to the inventive concept as herein described, the particle laden air may be cleansed of the particulate matter, as it passes through the fabric filter bags 12. The cleansed gas or air may then be extracted in some manner from the bag house.

As the particle laden gas passes through filter bags 12, particulate matter will continually build up on filter bags 12. In accordance with the present invention, as particulate matter accumulates on or suddenly falls from the inside of filter bag 12 as would be the case in reverse air cleaning, or in the alternative, by the weight build-up of bag 12, balanced tensioning is continuously provided while simultaneously permitting reasonable displacement of filter bags 12 in vertical direction 14. Provisions for vertical contraction/expansion or positive deflection of bags 12 is essential in order that the particular material forming filter bags 12 is not overstressed to the point of tearing. Additionally, provisions for reasonable vertical expansion or negative deflection of bags 12 is generally essential in order to prevent excessive bulging at the bottom of filter bags 12 which over a period of continued use may be destructive to the particular bag material.

Filter bag tensioning systems to alleviate some of the problems associated with bag growth and added bag weight have been used as described in U.S. Pat. Nos. 4,373,936 and 4,381,039, which are hereby incorporated by reference and assigned to the same Assignee as the subject invention concept. In such systems, a counterweight and balance arm is utilized in the tensioning procedure. However, it has been found that not all of the residue is cleaned from the filter bags during a reverse cleaning cycle, and such residual matter tends to add weight to the bag and require retensioning external to the capability of such prior tensioning devices.

In those prior art systems, additional mass or weight must be added to the counterweight in order to properly tension the devices. In general, the advantage of filter bag tensioning system 10 allows the user to adjust the tension to the changing conditions of filter bag 12 without having to add additional weights. As will be seen, filter bag tensioning system 10 allows the user to move a weight either closer or further from a fulcrum point in order to achieve a proper tension. Thus, as the conditions of filter bags 12 vary over continued use time, the subject filter bag tensioning system 10 allows for the adjustment and proper tensioning of filter bags 12 which was not possible with prior art bag tensioning devices.

Referring still further to FIGS. 1-3, filter bag tensioning system 10 for use in a bag house includes adjustable tensioning mechanism 16 extending in generally longitudinal direction 18. Adjustable tensioning mechanism 16 is pivotally coupled to frame member or cross bar member 20 which forms a portion of the general housing of the bag house, and are coupled to adjustable tensioning mechanism 16 which is pivotally coupled to frame or cross bar member 20. Adjustable tensioning mechanism 16 is coupled to filter bags 12 on adjustable tensioning mechanism second end 22. S-hook member 24 passes through filter bag support opening 26 formed through adjustable tension mechanism second end 22. S-hook member 24 also passes through upper link 28 of chain members 30. Chain members 30 are attached to filter bags 12 on an opposing end when taken with respect to vertical direction 14 through a hook mechanism, or some like mechanism not important to the inventive concept as is herein described.

As is shown in FIG. 1, filter bag tensioning system 10 may incorporate safety chain 32 which is coupled on opposing ends to upper link 28 of chain member 30 and S-hook 34 which is releasably secured to frame or cross bar member 20, as is shown.

Filter bag tensioning system 10 further includes semi-fixed weight 38 which is coupled to adjustable tensioning mechanism first end 40 for counter-balancing the weight of filter bag 12. As will be seen in following paragraphs, adjustable tensioning mechanism 16 includes a mechanism for linearly displacing weight 38 with respect to a pivot point of adjustable tensioning mechanism 16.

Figure 5:
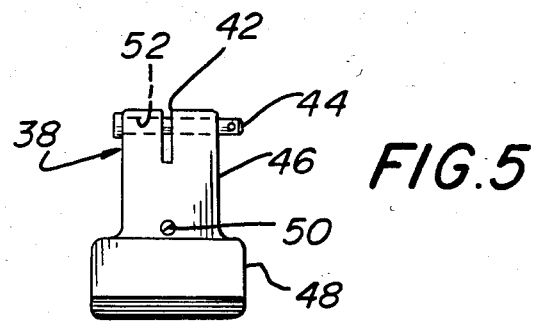

Weight member 38 as is shown in FIG. 5 may include a vertically elongated member having weight slot 42 passing partially throughout the vertical extension length of weight member 38. Weight shaft 44 extends through weight upper section 46 passing through weight slot 42. Weight lower section 48 includes an extended peripheral boundary to provide additional weight to the counterbalancing scheme. For purposes of discussion, the weight center of gravity is depicted by element 50. Weight shaft 44 passes through bore opening 52 in a releasable manner in order that weight shaft 44 may be removed from weight 38.

Weight 38 as shown in FIG. 5 is rotatively mounted to adjustable tensioning mechanism 16 on first end 40 by removal of weight shaft 44 from bore opening 52 and the insertion of adjustable tensioning mechanism first end 40 within weight slot 42 for alignment of first end opening 54 with bore opening 52. Weight shaft 44 is then inserted through bore opening 52 and first end opening 54 to rotatably couple weight member 38 to adjustable tensioning mechanism 16.

Adjustable tensioning mechanism 16 includes first tension adjustment member 56 coupled to weight member 38 on adjustable tensioning mechanism first end 40 through rotative coupling within adjustable tensioning mechanism first end opening 54. Adjustable tensioning mechanism 16 further includes second tension adjustment member 58 which is coupled to filter bag 12 on adjustable tensioning mechanism second end 22 through cooperation of S-hook 24 within filter bag support opening 26. First tension adjustment member 56 is securable to second tension adjustment member 58 in a longitudinally displaceable manner.

Second tension adjustment member 58 is pivotally coupled to frame member 20 through bracket 62 secured to one face of frame or cross bar member 20 through welding or some like technique, not important to the inventive concept as herein described. Pivot bracket 62 includes pivot pin member 64 which extends in transverse direction 66 through aperture 68 formed in second tension adjustment member 58. Aperture 68 is generally L-shaped in contour defining an elongated through slot section 70 extending in longitudinal direction 18 and end section opening 72 for receiving pivot pin member 64 during normal operation of filter bag tensioning system 10 when particulates are being collected on filter bags 12. As can be seen, slot section 70 of aperture 68 extends in longitudinal direction 18 toward first tension member 56.

Elongated slot section 70 is provided to allow shifting of pivot pin member 64 from normally engaging end section opening 72 in a manner to allow lowering of adjustable tensioning mechanism 16, as is shown in the phantom line drawing of FIG. 1. The positioning of pivot pin member 64 into slot section 70 has the resulting effect of lowering filter bags 12 which may then be worked upon by maintenance crews in a relatively easy manner. The use of aperture 68 and slot section 70 has been clearly described in U.S. Pat. Nos. 4,381,039 and 4,373,936, hereinbefore referenced.

Referring now to FIG. 3, first tension adjustment member 56 and second tension adjustment member 58 are operationally mounted each to the other in longitudinally contiguous relation in order to vary an overall longitudinal dimension of adjustable tensioning mechanism 16. As can be seen, first and second tension adjustment members 56 and 58 are substantially planar in contour. First adjustment tension member 56 includes transversely directed through openings 74 spaced apart each from the other in longitudinal direction 18. Second tension adjustment member 58 similarly includes a plurality of second member transverse through openings 76 adapted to be aligned in longitudinal direction 18 with first tension adjustment member through openings 74.

Referring to FIG. 3, there is seen pin insert member 78 and threaded insert member 80 for passage through first tension adjustment member 56 and second tension adjustment member 58. Insert members 78 and 80 pass through a pair of aligned openings 74, 76 formed through first and second tension adjustment members 56 and 58 for securing first tension adjustment member 56 to second tension adjustment member 58. As can be seen, first tension adjustment member 56 may be moved in longitudinal direction 18 to provide a predetermined longitudinal extension of adjustable tensioning mechanism 16. Appropriate openings 74 are aligned with openings 76 on member 58 and pin insert 78 may be inserted through openings 76 and 74. Threaded fastener or insert member 80 may then be inserted through another pair of aligned openings 74, 76 and threadedly coupled by threaded engagement of nut member 82 to threaded insert member 80. In this manner, first tension adjustment member 56 is restrained from rotative movement or displacement with respect to second tension adjustment member 58.

Three openings 74 are shown on first tension adjustment member 56 and similarly, three openings 76 are shown on second tension adjustment member 58. The number of longitudinally displaced openings 74 or 76 may exceed three and such are shown in FIG. 3 for example purposes only. For the example shown in FIG. 3, when all three openings 74 are aligned with the three openings 76, adjustable tensioning mechanism 16 is at its mid-point of location in longitudinal direction 18. Adjustable tensioning mechanism 16 may be then adjusted inwardly one increment to produce a less tension or may be adjusted incrementally to increase the length of adjustable tensioning mechanism 16 and correspondingly increase the effect of counterweight 18 on filter bag 12. Thus, incremental adjustments of the overall effect of counterweight 38 may be made on filter bag 12 through adjustment of the relative positioning of first tension adjustment member 56 with respect to second tension adjustment member 58. When it is desired to provide a length adjustment resulting in a tensioning adjustment, insert members 78 and 80 are removed from opening 74, 76 and a new set of openings 74, 76 are aligned in transverse direction 66. Insert members 78 and 80 are then re-introduced through corresponding and aligned openings 76 and 74, and first and second tension adjustment members 56 and 58 are fixedly secured each to the other. Insert member 78 is merely a weld pin used in this application as an anti-rotation device.

As has been described in previous paragraphs, semi-fixed counterweight 38 in the embodiments shown, may be a solid metal casting, or body member consisting of a generally rectangular or regular parallelepiped shaped upper portion 46 which merges into an elongated and generally rectangular or regular parallellepiped contoured lower portion 48. It is to be understood that the shape and overall contour of counterweight 38 is not part of the inventive concept as herein described, other than such is to establish a desired vertical location for center of gravity 50 and should generally be symmetrically contoured in order that center of gravity 50 may be readily located and positioned in a known location with respect to adjustable tensioning mechanism 16.

As is shown in FIGS. 1 and 5, counterweight 38 is attached to adjustable tensioning mechanism 16 and in particular, to first tension adjustment member 56 by means of weight shaft 44 passing through aligned circular bores 52 in counterweight 38 and opening 54 formed through first tensioning adjustment member 56. The depth of weight slot 42 in vertical direction 14 is substantially equal to, but slightly less than, the distance from adjustable tensioning mechanism first end opening 54 to first tension adjustment member lower surface 60. Additionally, the distance from adjustable tensioning mechanism first end opening 54 to adjustable tensioning mechanism first end 40 is substantially less than the depth of weight slot 42. In this manner, counterweight 38 is precluded from rotating in a counter-clockwise direction as taken with respect to FIG. 1, however, clockwise rotation may be achieved and in the embodiments shown, such clockwise rotation may be to the extent of slightly greater than 270°. The rotational capabilities and restraints of weight member 38 are similar to and have been previously described in U.S. Pat. Nos. 4,373,936 and 4,381,039.

Figure 4:
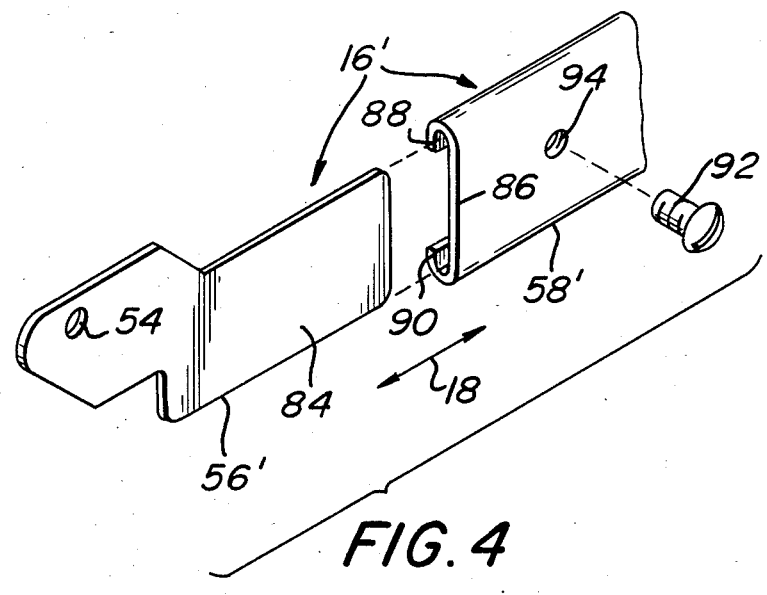
FIG. 4 is a perspective view, partially in cut-away, showing an embodiment of the adjustable tensioning mechanism used in the filter bag tensioning system; and, FIG. 5 is an elevational view of the counterbalance weight provided in the filter bag tensioning system.

Referring now to FIG. 4, there is shown an embodiment of filter bag tension system 10 utilizing adjustable tension mechanism 16'. Adjustable tensioning mechanism 16' includes first tension adjustment member 56' and second tension adjustment member 58'. As is seen, first tension adjustment member 56' is generally planar in contour and is similar in overall contour to first tension adjustment member 56 shown and described in FIG. 3. However, first tension adjustment member 56' includes continuous face 84 which does not have discrete openings formed therethrough, as is the case in first tension adjustment member 56. First tension adjustment member 56' includes adjustable tensioning mechanism first end opening 54 which is of generally the same diameter as that provided for first tension adjustment member 56 and further opening 54 is positionally located in an identical positional location as that for member 56.

Adjustable tensioning mechanism 16' further includes second tension adjustment member 58' which includes a longitudinally extended section having C-channel cross-sectional contour 86. C-channel section 86 includes opposing U-shaped flanges 88 and 90 within which first tension adjustment member 56' is slidingly engaged when displaced in longitudinal direction 18. The distance between the internal surfaces of opposing U-flanges 88 and 90 in vertical direction 14 is substantially equal to, but slightly greater than, the vertical dimension of face 84 of first tension adjustment member 56'. In this manner, first tension adjustment member 56' may be slidingly engaged within second tension adjustment member 58' and loosely held by U-flanges 88 and 90.

As is seen in FIG. 4, second tension adjustment member 58' may also include threaded opening 94 within which set screw member 92 may be threadedly engaged. Thus, subsequent to insertion of first tension adjustment member 56' in a predetermined location within second tension adjustment member 58', set screw member 92 may be threaded to impinge on face section 84. In this manner, first tension adjustment member 56' may be held in fixed securement with respect to second tension adjustment member 58'.

Through use of adjustable tensioning mechanism 16', the user has the capability of positionally locating weight member 38 at a predetermined continuous distance from the pivot and allows the user a wider latitude in positioning concepts. It is obvious to one skilled in the art that first tension adjustment member 56' may include a longitudinally slot and that set screw 92 can be a threaded fastener passing through such a slot to be coupled through a nut engagement, as was seen for the preferred embodiment shown in FIG. 3.

Referring now to FIG. 1, and as has been described in previous paragraphs, filter bag tensioning system 10 provides for weight 38 to be rotatively coupled to first end 40 of adjustable tensioning mechanism 16 and in particular, to first tensioning adjustment member 56. Weight 38 may be displaced about first end 40 of adjustable tensioning mechanism 16 from lower surface 60 to an upper surface position, as can be seen from the phantom line drawings. Thus, center of gravity 50 of weight 38 is positioned below first end 40 of adjustable tensioning mechanism 16 when adjustable tensioning mechanism 16 is in a horizontal position, as is shown by the dark line drawings of FIG. 1. The distance from the center of gravity 50 of weight 38 to pivot point or pivot member 64 remains substantially constant as adjustable tensioning mechanism 16 is rotated above the horizontal, as has been described in previous paragraphs and is clearly shown in U.S. Pat. Nos. 4,373,936 and 4,381,039. Additionally, center of gravity 50 has a varying distance as a function of the inclination angle when adjustable tensioning mechanism 16 is rotatively displaced below the horizontal plane, as is clearly evident by the phantom line drawings of FIG. 1.

In operation, there is now provided not only filter bag tensioning system 10, but also a method of attaching and replacing filter bags 12 in a bag house in which adjustable tensioning mechanism 16 is pivotally supported intermediate its ends 22, 40 at a desired pivot point 64 within the upper reaches of the bag house. Additionally, adjustable tensioning mechanism 16 is provided with a filter bag support adjacent end 22 and a weight 38 and weight securement mechanism adjacent end 40. The steps of operation include rotating weight securement for first end 40 of adjustable tensioning mechanism 16 to a substantially vertical positional disposition, as is shown in phantom line drawings of FIG. 1.

The bag support end or second end 22 of adjustable tensioning mechanism 16 may then be moved vertically downward in vertical direction 14 by placement of pivot pin member 64 into elongated slot section 70 of through aperture 68. Filter bags 12 may then be coupled into filter bag support opening 26 by S-hook 24.

Weight securement end 40 of first tension adjustment member 56 may then be rotated to a generally lateral position relative to pivot or pivot pin member 64, as is shown in full line drawings of FIG. 1. Adjustable tensioning mechanism 16 may be then displaced in a manner that pivot pin member 64 is inserted within end section opening 72 of aperture 68 to provide a pivot point or axis around which adjustable tensioning mechanism 16 may be rotated. First tension adjustment member 56 may be displaced relative to second tension adjustment member 58 of adjustable tensioning mechanism 16 to provide a predetermined tension on filter bag 12. First tension adjustment member 56 is moved or displaced in longitudinal direction 18 in order to provide alignment with opening 74, 76 in respective members 56 and 58. Alternatively, where the embodiment shown in FIG. 4 is utilized, member 56' is slidingly engaged within member 58' to the predetermined distance necessitated by a predetermined tension on filter bag 12.

First tension adjustment member 56 or 56' is then fixedly secured to second adjustment member 58 or 58' through pin inserts 78, 80 or by utilization of set screw 92.

When a particular filter bag 12 is to be replaced, the sequence of steps hereinbefore described are then repeated with the removal of an existing filter bag 12 and the attachment of a new filter bag 12.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of attaching and replacing a filter bag in a bag house in which an adjustable tensioning mechanism is pivotally supported intermediate its ends at a desired pivot point by a pivot affixed within the upper reaches of said bag house and said adjustable tensioning mechanism is provided with filter bag support means adjacent one end and a weight and weight securement means adjacent an opposing end including the steps of:
   (a) rotating said weight securement end of said adjustable tensioning mechanism to a substantially vertical positional disposition;
   (b) moving said bag support end of said adjustable tensioning mechanism in a substantially vertically downward direction;
   (c) attaching a filter bag to said filter bag support means;
   (d) rotating said weight securement end of said adjustable tensioning mechanism to a generally lateral position relative to said pivot;
   (e) displacing said adjustable tensioning mechanism to said pivot point;
   (f) adjusting a first tension adjustment member relative to a second tension adjustment member of said adjustable tensioning mechanism to provide a predetermined filter bag tension;
   (g) fixedly securing said first tension adjustment member to said second adjustment member; and,
   (h) when said filter bag is to be replaced, repeating said above sequence of steps with removal of said existing filter bag and attachment of a new filter bag.

2. The method of attaching and replacing a filter bag as recited in claim 1 where said step of rotating said weight securement end includes the step of rotating said weight securement end about said pivot.

3. The method of attaching and replacing a filter bag as recited in claim 1 where the step of moving said bag support end includes the step of displacing said pivot with respect to said adjustable tensioning mechanism within a slot formed through said adjustable tensioning mechanism.

4. The method of attaching and replacing a filter bag as recited in claim 3 where the step of displacing said pivot includes the step of linearly displacing said pivot with respect to said adjustable tensioning mechanism.

5. The method of attaching and replacing a filter bag as recited in claim 1 where the step of moving said bag support end of said adjustable tensioning mechanism is followed by the step of rotating said weight by at least 90° about said weight securement means when said weight securement end of said adjustable tensioning mechanism is in said substantially vertical positional disposition.

6. The method of attaching and replacing a filter bag as recited in claim 1 where the step of moving said bag support end of said adjustable tensioning mechanism is followed by the step of rotating said weight by at least 180° about said weight securement means when said weight securement end of said adjustable tensioning mechanism is in said substantially vertical positional disposition.

7. The method of attaching and replacing a filter bag as recited in claim 1 where the step of displacing said first tension adjustment member relative to said second tension adjustment member includes the step of linearly displacing said first tension adjustment member with respect to said second tension adjustment member.

8. The method of attaching and replacing a filter bag as recited in claim 7 where said linear displacement is provided in discrete incremental dimensional lengths.

9. The method of attaching and replacing a filter bag as recited in claim 8 where said first and second tension adjustment members include a plurality of alignable spaced openings formed therethrough, said first and second tension adjustment members being secured each to the other through aligned openings formed in said first and second tension adjustment members.

10. The method of attaching and replacing a filter bag as recited in claim 8 where the step of linearly displacing said first tension adjustment member includes the step of reversibly displacing said weight with respect to said pivot point in discrete increments of length.

11. The method of attaching and replacing a filter bag as recited in claim 7 where said linear displacement is provided in a continuous linear displacement throughout a predetermined length dimension.

12. The method of attaching and replacing a filter bag as recited in claim 11 where said first tension adjustment member is fixedly secured to said second tension adjustment member at any point within said predetermined length dimension.

13. A filter bag tensioning system for use in a bag house, comprising:
    (a) adjustable tensioning means pivotally coupled to a frame member of said bag house for providing a predetermined bag tension, said adjustable tensioning means being releasably coupled on a second end thereof to said filter bag, said adjustable tensioning means including a first tension adjustment member coupled to said weight means on one end thereof and a second tension adjustment member coupled to said bag on one end thereof, said first tension adjustment member being securable to said second tension adjustment member in a longitudinally displaceable manner; and,
    (b) weight means coupled to a first end of said adjustable tensioning means for counterbalancing the weight of said filter bag, said adjustable tensioning means including means for linearly displacing said weight means with respect to a pivot point of said adjustable tensioning means.

14. The filter bag tensioning system as recited in claim 13 where said second tension adjustment member includes an aperture formed therethrough having one end thereof for receiving said pivot.

15. The filter bag tensioning system as recited in claim 14 where said aperture is L-shaped in contour defining an elongated through slot for receipt of said pivot.

16. The filter bag tensioning system as recited in claim 15 where said elongated through slot formed in said second tension adjustment member extends in said longitudinal direction toward said first tension adjustment member.

17. The filter bag tensioning system as recited in claim 13 where said first tension adjustment member and said second tension adjustment member are mounted each to the other in longitudinally contiguous relation for varying an overall longitudinal dimension of said adjustable tensioning means.

18. The filter bag tensioning system as recited in claim 17 where said first and second tension adjustment members are substantially planar in contour having longitudinally displaced openings formed therethrough for aligning predetermined openings of said first tension adjustment member with predetermined openings of said second tension adjustment member.

19. The filter bag tensioning system as recited in claim 18 including at least a pair of insert members extending through a respective pair of aligned openings formed through said first and second tension adjustment members for securing said first tension adjustment member to said second tension adjustment member.

20. The filter bag tensioning system as recited in claim 19 where at least one of said insert members is a pin member slidingly insertable through said aligned openings.

21. The filter bag tensioning system as recited in claim 19 where at least one of said insert members is a threaded fastener for threadedly engaging said first tension adjustment member to said second tension adjustment member.

22. The filter bag tensioning system as recited in claim 17 where said second tension adjustment member includes a longitudinally extended section having a C-channel cross-sectional contour, said first tension adjustment member having a substantially planar longitudinally extended section.

23. The filter bag tensioning system as recited in claim 22 where said planar longitudinally extended section of said first tension adjustment member is slidingly insertable in said longitudinal direction within said C-channel of said second tension adjustment member.

24. The filter bag tensioning system as recited in claim 23 including a threaded fastener member for threadedly engaging a through opening formed through said second tension adjustment member and contacting a surface of said first tension member to capture said first tension adjustment member within said C-channel.

25. The filter bag tensioning system as recited in claim 13 where said weight means is rotatively coupled to said first end of said adjustable tensioning means.

26. The filter bag tensioning system as recited in claim 25 where the center of gravity of said weight means may be displaced about said first end of said adjustable tensioning means from a lower surface position to an upper surface position.

27. The filter bag tensioning system as recited in claim 26 where said center of gravity of said weight means is positioned below said first end of said adjustable tensioning means when said adjustable tensioning means is in a horizontal position, the distance from said weight means center of gravity to said pivot point (1) remaining substantially constant as said adjustable tensioning means is rotated above said horizontal, and, (2) varying as a function of inclination angle when said adjustable tensioning means is rotatively displaced below said horizontal.

* * * * *